(12) United States Patent
Zheng et al.

(10) Patent No.: US 9,204,011 B1
(45) Date of Patent: Dec. 1, 2015

(54) APPARATUS AND METHOD FOR EXTRACTING A BACKGROUND LUMINANCE MAP OF AN IMAGE, DE-SHADING APPARATUS AND METHOD

(71) Applicant: FUJITSU LIMITED, Kawasaki (JP)

(72) Inventors: Yun Zheng, Beijing (CN); Wei Fan, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/717,273

(22) Filed: May 20, 2015

(30) Foreign Application Priority Data

Jul. 7, 2014 (CN) .......................... 2014 1 0320078

(51) Int. Cl.
  *H04N 1/407* (2006.01)
  *H04N 1/409* (2006.01)
  *G06T 5/00* (2006.01)
  *H04N 1/401* (2006.01)

(52) U.S. Cl.
  CPC *H04N 1/401* (2013.01); *G06T 5/00* (2013.01); *G06T 5/008* (2013.01); *H04N 1/407* (2013.01); *H04N 1/409* (2013.01); *H04N 2201/0081* (2013.01)

(58) Field of Classification Search
  None
  See application file for complete search history.

(56) References Cited

U.S. PATENT DOCUMENTS

| | | | | |
|---|---|---|---|---|
| 4,731,865 A * | 3/1988 | Sievenpiper | ............ | G06T 5/009 382/274 |
| 5,808,756 A * | 9/1998 | Matsuda | ................ | H04N 1/401 358/464 |
| 6,192,163 B1 * | 2/2001 | Murayama | ................ | G06T 5/20 382/274 |
| 6,621,595 B1 * | 9/2003 | Fan | ...................... | H04N 1/4095 358/3.26 |
| 7,733,548 B2 * | 6/2010 | Makino | .................. | H04N 1/387 358/474 |
| 8,565,556 B2 * | 10/2013 | Toda | ....................... | G06T 3/403 382/300 |
| 8,792,139 B2 * | 7/2014 | Makino | .................. | H04N 1/409 358/1.9 |
| 8,804,209 B2 * | 8/2014 | Iwayama | ................ | G06T 5/008 358/1.9 |
| 2010/0177360 A1 * | 7/2010 | Shimokawa | ........... | H04N 1/401 358/461 |
| 2015/0163376 A1 * | 6/2015 | Pan | ...................... | H04N 1/4072 358/461 |
| 2015/0235080 A1 * | 8/2015 | Pan | ..................... | G06K 9/00442 382/112 |

* cited by examiner

*Primary Examiner* — Scott A Rogers
(74) *Attorney, Agent, or Firm* — Staas & Halsey LLP

(57) ABSTRACT

An apparatus and a method for extracting a background luminance map of an image, and a de-shading apparatus and method. The apparatus includes: a luminance extracting unit, configured to extract luminance values everywhere in the image to obtain a luminance map; a separating unit, configured to separate background from foreground of the image based on the luminance map, to obtain an initial background luminance map; a top and bottom luminance obtaining unit, configured to extract top and bottom luminance of the initial background luminance map, and in the case of a part of the top and/or bottom luminance being missing, to supplement the missing part utilizing existing data of the top and/or bottom luminance to obtain complete top and bottom luminance; and an interpolation unit, configured to perform interpolation on the whole image based on the complete top and bottom luminance, to obtain the background luminance map of the image.

11 Claims, 9 Drawing Sheets

APPARATUS AND METHOD FOR EXTRACTING A BACKGROUND LUMINANCE MAP OF AN IMAGE, DE-SHADING APPARATUS AND METHOD

CROSS REFERENCE TO RELATED APPLICATIONS

This application claims the benefit of Chinese Application No. 201410320078.1, filed Jul. 7, 2014, the disclosure of which is incorporated herein by reference.

FIELD

The present disclosure relates to image processing field, specifically to computer vision. More particularly, the present disclosure relates to an apparatus and a method for extracting a background luminance map of an image, a de-shading apparatus and method for automatically removing shadings in an image, as well as a scanner or a digital camera including the de-shading apparatus.

BACKGROUND

Nowadays, images of a scanned objects, such as paper books or magazines, can be acquired through a device such as a scanner or a digital camera so that the scanned object is digitized. However, due to the impact of a ray of light and the bending of the surface itself of the scanned object, such as a book, the acquired images generally have shadings therein, as shown in FIG. 1. Therefore, to improve the imaging effect, it is desired to remove these shadings automatically.

SUMMARY

In the following, an overview is given simply to provide basic understanding to some aspects. It should be understood that this overview is not an exhaustive overview. It is not intended to determine a critical part or an important part, nor to limit the scope. An object of the overview is only to give some concepts in a simplified manner, which serves as a preface of a more detailed description described later.

According to an aspect, there is provided an apparatus for extracting a background luminance map of an image, including: a luminance extracting unit, configured to extract luminance values everywhere in the image to obtain a luminance map; a separating unit, configured to separate background from foreground of the image based on the luminance map, to obtain an initial background luminance map; a top and bottom luminance obtaining unit, configured to extract values of a top row and a bottom row of the initial background luminance map as top luminance and bottom luminance respectively, and in the case of a part of the top luminance and/or the bottom luminance being missing, to supplement the missing part utilizing existing data of the top luminance and/or the bottom luminance to obtain complete top luminance and bottom luminance; and an interpolation unit, configured to perform interpolation on the whole image based on the complete top luminance and bottom luminance obtained by the top and bottom luminance obtaining unit, to obtain the background luminance map of the image.

According to another aspect, there is provided a de-shading apparatus for removing shadings in an image, including the above mentioned apparatus for extracting a background luminance map of an image, and the de-shading apparatus further includes: a removing unit, configured to remove affect of the background luminance map from the luminance map.

According to another aspect, there is further provided a method for extracting a background luminance map of an image, including: extracting luminance values everywhere in the image to obtain a luminance map; separating background from foreground of the image based on the luminance map, to obtain an initial background luminance map; extracting values of a top row and a bottom row of the initial background luminance map as top luminance and bottom luminance respectively, and in the case of a part of the top luminance and/or the bottom luminance being missing, supplementing the missing part utilizing existing data of the top luminance and/or the bottom luminance to obtain complete top luminance and bottom luminance; and performing interpolation on the whole image based on the complete top luminance and bottom luminance obtained, to obtain the background luminance map of the image.

According to yet another aspect, there is further provided a de-shading method for removing shadings in an image, including the above mentioned method for extracting a background luminance map of an image, and the de-shading method further includes: removing affect of the background luminance map from the luminance map.

According to another aspect, there is further provided a scanner and a digital camera, including the above mentioned de-shading apparatus.

According to other aspects, there are further provided corresponding computer program codes, computer readable storage medium and computer program product.

These and other advantages will be more apparent by illustrating in detail preferred embodiments in conjunction with accompanying drawings below.

BRIEF DESCRIPTION OF THE DRAWINGS

To further set forth the above and other advantages and features, a detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments and should not be construed as a limitation to the scope. In the accompanying drawings.

DETAILED DESCRIPTION

An exemplary embodiment will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring embodiments due to unnecessary details, only a device structure and/or processing steps closely related to the solution according to the present invention are illustrated in the accompanying drawing, and other details having little relationship to the embodiments are omitted.

As stated above, it is desired to provide an apparatus and a method to implement automatic removing of shadings in an image obtained by imaging a scanning object such as a book. To solve this problem, the key point is to acquire the background luminance map of the image accurately, especially in the case of the page layout being complex.

Figure 2:
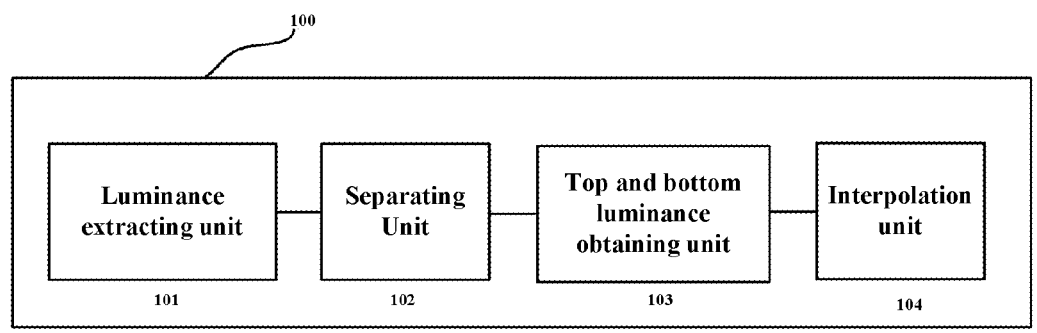
FIG. 2 illustrates a structural block diagram of the apparatus for extracting a background luminance map of an image according to an embodiment of the present application.

In the following, the structure of an apparatus 100 for extracting a background luminance map of an image according to an embodiment of the application will be described with reference to FIG. 2. As shown in FIG. 2, the apparatus 100 includes: a luminance extracting unit 101, configured to extract luminance values everywhere in the image to obtain a luminance map; a separating unit 102, configured to separate background from foreground of the image based on the luminance map, to obtain an initial background luminance map; a top and bottom luminance obtaining unit 103, configured to extract values of a top row and a bottom row of the initial background luminance map as top luminance and bottom luminance respectively, and in the case of a part of the top luminance and/or the bottom luminance being missing, to supplement the missing part utilizing existing data of the top luminance and/or the bottom luminance to obtain complete top luminance and bottom luminance; and an interpolation unit 104, configured to perform interpolation on the whole image based on the complete top luminance and bottom luminance obtained by the top and bottom luminance obtaining unit, to obtain the background luminance map of the image.

To acquire the background luminance map of the image, the apparatus 100 first separates the background from the image, utilizes the existing data of the top luminance and the bottom luminance to supplement the missing part, and then performs interpolation on the whole image using the acquired complete top luminance and bottom luminance.

Figure 1:
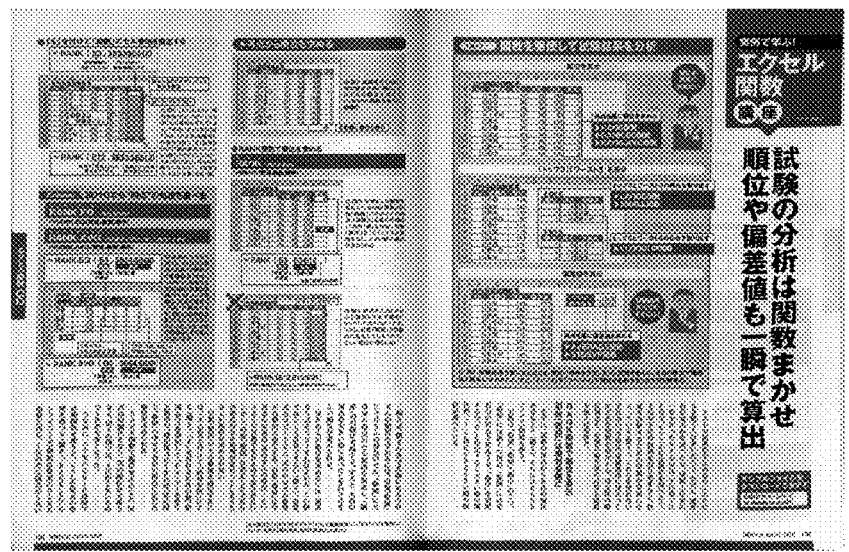
FIG. 1 illustrates an example of an image with shadings.

The image herein can be a color image, or a grayscale image. An example of the image is shown in FIG. 1.

The luminance extracting unit 101 can extract the luminance value with respect to each of the pixels so as to obtain the luminance map. As an example, when the image is a color image, the luminance extracting unit 101 can convert the color image into YUV color space, and take or with the Y image thereof as the luminance map. While the image is a grayscale image, the luminance extracting unit 101 can use the grayscale values as the luminance values.

Figure 3:
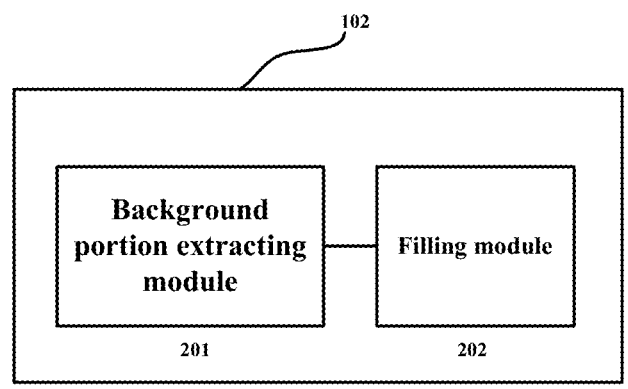
FIG. 3 illustrates a structural block diagram of a separating unit according to an embodiment of the present application.

Then, the separating unit 102 separates the background from the foreground of the image according to the difference of their features in luminance based on the luminance map. That is, the content information of the image is utilized. An example of the separating unit 102 is given below with reference to FIG. 3. As shown in FIG. 3, the separating unit 102 includes: a background portion extracting module 201, configured to extract a portion which is the background in the luminance map; and a filling module 202, configured to fill the foreground to a certain extent using values of pixels of the background portion around the foreground, and take the luminance map obtained after filling as the initial background luminance map.

Wherein, the filling module 202 is provided in order to remove regions with small areas in the foreground, thereby reducing noise. Filling herein can be to replace values of at least part of the pixels in the foreground with the values of the pixels in the background portion, and the extent of the filling, i.e., the number of pixels filled each time can be set in advance.

Figure 4:
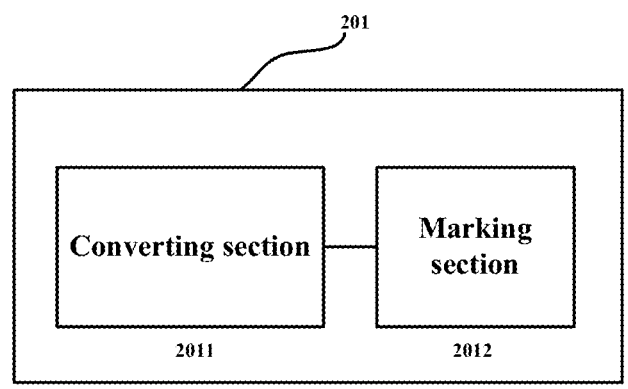
FIG. 4 illustrates a structural block diagram of a background portion extracting module according to an embodiment of the present application.

FIG. 4 illustrates a structural block diagram of the background portion extracting module 201 according to an embodiment of the present application. The background portion extracting module 201 includes: a converting section 2011, configured to convert the luminance map into a gradient map and perform binarization of the gradient map; and a marking section 2012, configured to mark a white connected component with the largest size and other white connected components whose average luminance is differed from that of the white connected component with the largest size within a certain range as the background portion.

Figure 5:
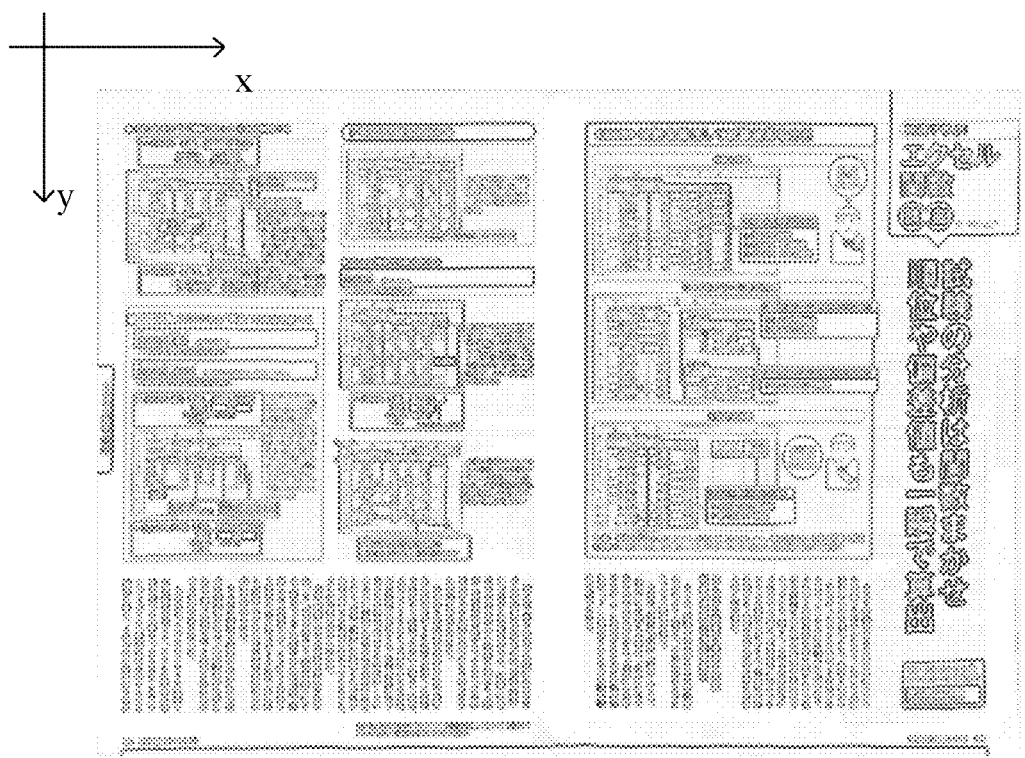
FIG. 5 illustrates an example of a gradient map corresponding to the image of FIG. 1.
Figure 6:
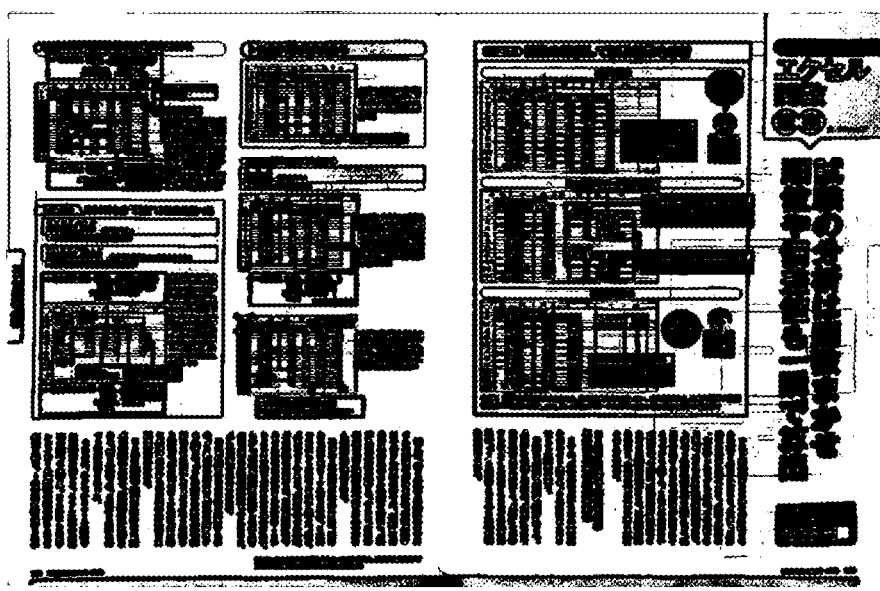
FIG. 6 illustrates an example of a map obtained by binarization of FIG. 5.

The background portion extracting module 201 makes use of the characteristic that the background varies relatively slower while the foreground varies relatively faster, to extract the background portion. Still taking the image in FIG. 1 as an example, the gradient map obtained by subjecting its luminance map to the processing of the converting section 2011 is shown in FIG. 5, and the corresponding map after binarization is shown in FIG. 6 where the foreground portion is denoted in black and the background portion is denoted in white. To facilitate description, the horizontal direction is defined as x direction and the vertical direction is defined as y direction in FIG. 5.

Wherein, the gradient map can be acquired by performing convolution using a convolution template, such as a template with the horizontal direction, i.e., x direction being $[-1, 0, 1]$ and the vertical direction, i.e., y direction being $[-1, 0, 1]^T$. The gradient map can further be normalized for example to interval of [0, 255] after convolution. In addition, the threshold of the binarization can be acquired by calculating 90% division of the histogram of the gradient map, which is just shown as an example. Of course, other percentages can be adopted.

Then, the marking section 2012 finds a white connected component with the largest area and takes it as the background portion. Meanwhile, the marking section 2012 further marks other white connected components whose average luminance is close to that of the white connected component as the background portion. The average luminance being close herein can refer to that the difference of the average luminance between the two is within a certain range (for example, 60). In addition, besides comparing the average luminance values, average color, i.e., average U value and V value can also be compared. In other words, the white connected components whose average luminance and average color are close are marked as the background portion. After marking FIG. 6, the image shown in FIG. 7 is acquired, where the white portion is the background portion.

In an embodiment, if the average luminance of the background portion extracted by the background portion extracting module 201 is lower than a certain threshold (such as 120), the top and bottom luminance obtaining unit 103 sets both the top luminance and the bottom luminance to be the largest luminance value in corresponding columns of the luminance map. In this case, since the background is relatively dark, it is unnecessary to consider the variation of the background luminance in the column direction. The column direction herein is, for example, the vertical direction, i.e., the y direction in FIGS. 5 and 6.

Figure 7:
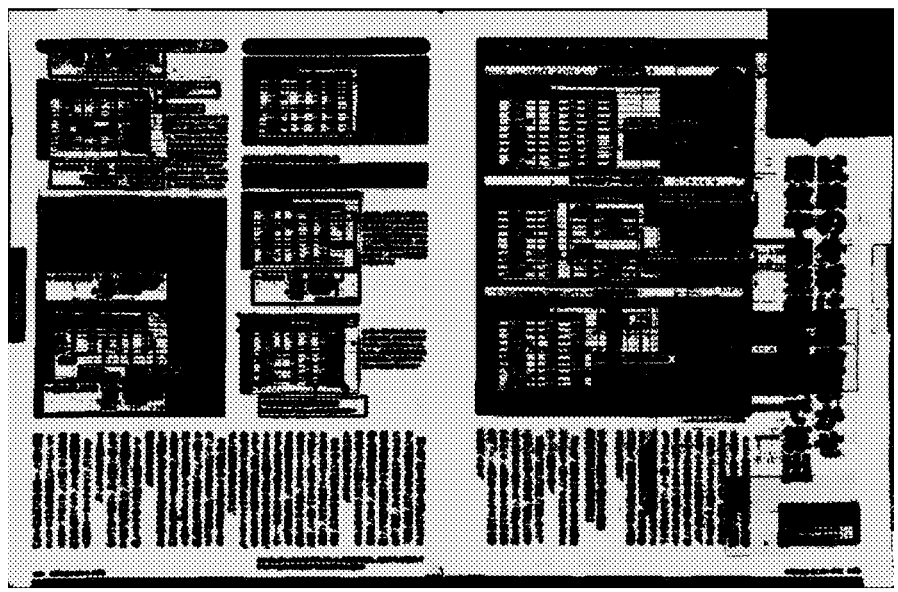
FIG. 7 illustrates an example of a map obtained by marking FIG. 6.
Figure 8:
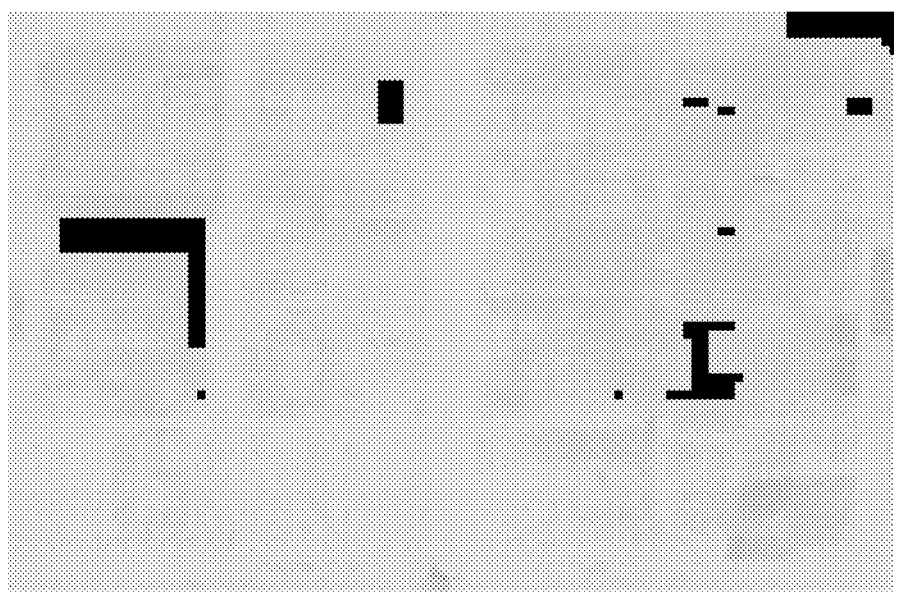
FIG. 8 illustrates an example of an initial background luminance map obtained by filling FIG. 7.

Further, FIG. 8 illustrates the initial background luminance map acquired by processing the image shown in FIG. 7 using the filling module 202.

As can be seen, the right side of the top portion in this map is foreground instead of background. Therefore, when the top and bottom luminance obtaining unit 103 extracts the values of the top row of the initial background luminance map as the top luminance, the background luminance values corresponding to this part are missing. This phenomenon is caused for example by complex page layout. In this case, the top and bottom luminance obtaining unit 103 makes use of the existing data to supplement the missing part to obtain complete top luminance.

Likewise, if there is a missing part in the bottom luminance, the top and bottom luminance obtaining unit 103 performs similar processing to obtain complete bottom luminance.

Wherein, the top and bottom luminance obtaining unit 103 can be configured to supplement the missing part in the top luminance and/or the bottom luminance by utilizing polynomial fitting based on the existing data.

For example, a polynomial f(x) of n orders can be constructed to fit the existing data, as shown in the following equation (1), and the fitted f(x) can be used to calculate the luminance values of the missing part.

$$\sum_{x \in C} (f(x) - Y_x)^2 \tag{1}$$

Figure 9:
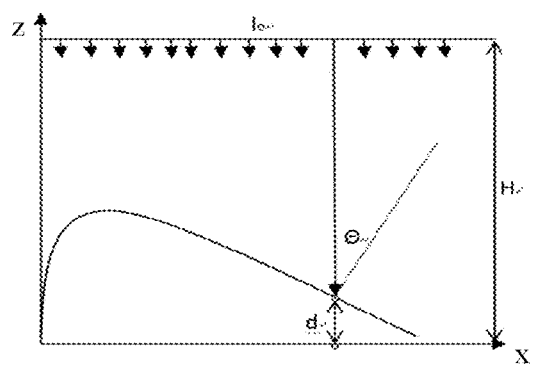
FIG. 9 illustrates a schematic drawing of a model used in filling a missing part.

Wherein, x is the distance to the left edge, C denotes the part of the top luminance where there is data, such as the white part from the left in the top in FIG. 8, f(x) is the estimated background luminance at x denoted by a polynomial, $Y_x$ is the actual value of background luminance at the corresponding location acquired from the existing data. FIG. 9 illustrates an exemplary ray of light illuminating model, where z direction is a direction perpendicular to the xy plane (i.e., the desktop), the arc denotes a sectional plane along a direction perpendicular to the desktop of the book which is placed on the desktop flatwise and laid opened, and the ray of light is illuminated from the above. In equation (1), it is assumed that the background luminance value is related to the position in the x direction.

The polynomial f(x) can be determined by minimizing equation (1), and then f(x) can be applied to the right side part whose data is missing, that is, the black part on the top right side in FIG. 8, so that complete top luminance can be acquired. Likewise, if there is a missing part in the bottom luminance, the equation (1) can also be used to perform similar processing.

In an embodiment, the top and bottom luminance obtaining unit 103 can be further configured to employ the least square method to perform the polynomial fitting. Of course, other existing polynomial fitting methods can also be used, and are not limited thereto.

In another embodiment, the top and bottom luminance obtaining unit 103 can further be configured to calculate the estimated luminance of the missing part in the top luminance and/or the bottom luminance based on a Lambertian reflectance model, and supplement the missing part in the top luminance and/or the bottom luminance by taking values related to the estimated luminance as part of the existing data.

Specifically, the top and bottom luminance obtaining unit 103 can use the following equation (2) to perform fitting of the polynomial f(x).

$$\sum_{x \in C} (f(x) - Y_x)^2 + \lambda \sum_{x \in M} (f(x) - L(x))^2 \tag{2}$$

Wherein, the first sum in equation (2) has the same meaning as equation (1), and in the second sum, L(x) denotes the estimated background luminance values of the missing part based on the Lambertian reflectance model, and M denotes the part among the top luminance or the bottom luminance whose data is missing, such as the black part on top right in FIG. 8. ζ denotes the weighting coefficient for adjusting the proportions occupied by the two parts respectively.

The Lambertian reflectance model can be represented as follows, wherein, $I_0$ denotes the lighting luminance of the light source, as shown in FIG. 9. $I_0$ is the lighting luminance at a height of H which is the height with respect to the desktop on which the book is placed, d is the height of the pages of the book with respect to the desktop, which varies as the location in the x direction varies, and θ is the angle between the direction normal to the pages and z direction.

$$L = \frac{I_0 \cos \theta}{H - d} \tag{3}$$

This reflectance model can only estimate the background luminance coarsely. However, since the ray of light is not necessarily perpendicular strictly, and the height d is not necessarily accurate, it is not accurate to use this model to calculate the background luminance directly. In this embodiment, its calculation result is used as a part of the existing data to perform fitting of the polynomial f(x), so that the 3-dimensional shape information of the book corresponding to the image is utilized. Therefore, more accurate results can be obtained than just using the equation (1) to perform fitting.

In addition, the derivative of the estimated luminance along a direction in parallel to sides of the top and the bottom is taken as a part of the existing data to perform polynomial fitting, as shown in the following equation (4).

$$\sum_{x \in C} (f(x) - Y_x)^2 + \lambda \sum_{x \in M} (f'(x) - L'(x))^2 \qquad (4)$$

Compared with the equation (3), this equation (4) uses the derivative of L(x) to perform calculation, which reduces the impact of d being inaccurate, and thus more accurate results can be obtained.

In other embodiments, the top and bottom luminance obtaining unit 103 can further be configured to supplement the missing part in the top luminance and/or the bottom luminance using linear interpolation based on the existing data. For example, the data in the existing data which is closest to the missing part can be adopted to perform the linear interpolation. It can be understood that data which is completely the same as at least part of the existing data can be used to supplement the missing part.

As can be seen, by using the top and bottom luminance obtaining unit 103, even in the case of the top luminance and/or the bottom luminance being incomplete due to the complex page layout, the missing part can also be supplemented, so that complete data of top luminance and bottom luminance can be acquired, and the accuracy of the subsequent interpolation can be improved.

The interpolation unit 104 performs linear interpolation on the whole image by using the top luminance and the bottom luminance. For example, the top left corner of the image is assumed as the origin of the coordinate system, and in the case that the coordinate axes setting in FIG. 5 is used, the following formula (5) can be used to acquire the background luminance values BI at respective locations.

$$BI(x,y) = (y/S) * I_{top,x} + (1-y/S) * I_{bottom,x} \qquad (5)$$

Figure 10:
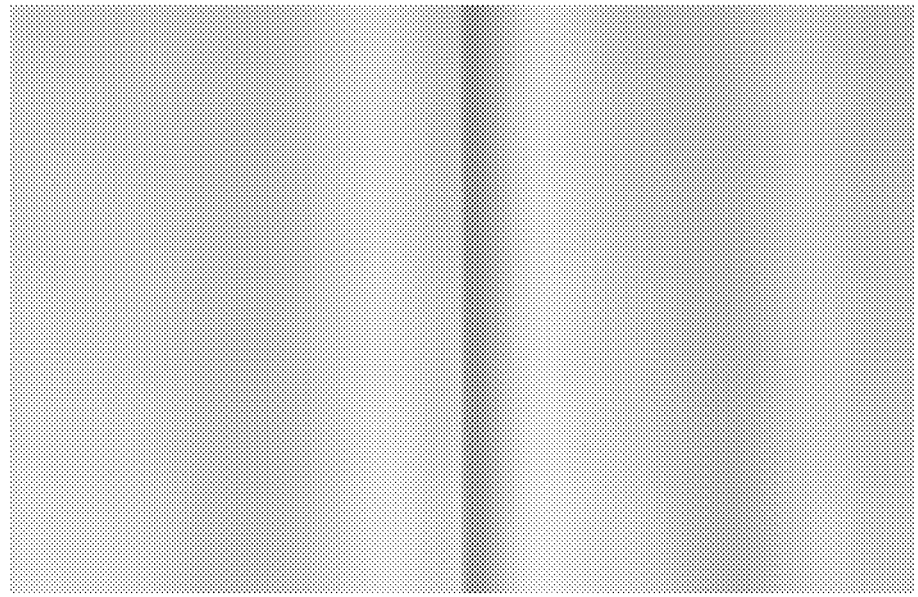
FIG. 10 illustrates an example of a finally acquired background luminance map.

Wherein, S is the length of the pages of the book in y direction, $I_{top,x}$ denotes the top luminance, and $I_{bottom,x}$ denotes the bottom luminance. The finally acquired background luminance map is for example shown in FIG. 10.

Figure 11:
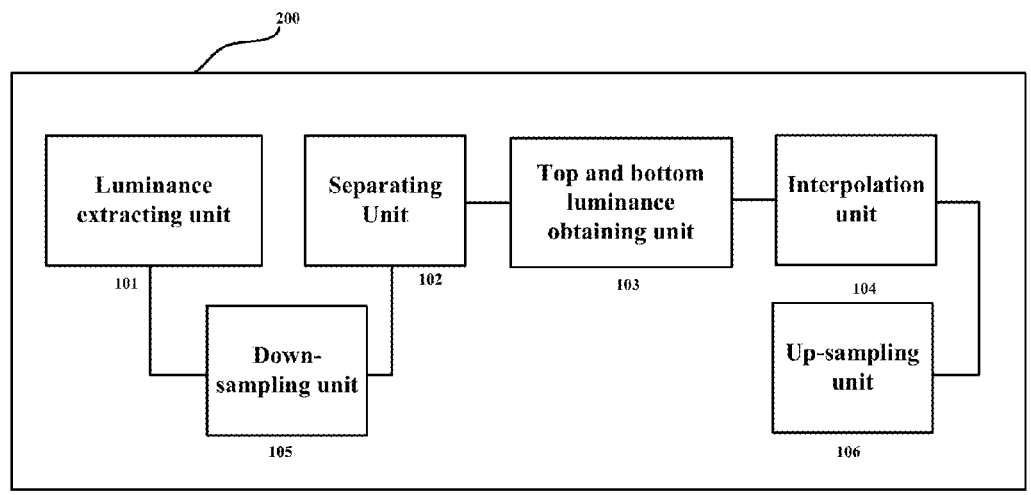
FIG. 11 illustrates a structural block diagram of the apparatus for extracting a background luminance map of an image according to another embodiment of the present application.

In addition, when the resolution of the image is high, to reduce the amount of calculation and improve processing speed, the apparatus 200 for extracting a background luminance map according to an embodiment of the present application shown in FIG. 11 can be adopted. In addition to the components included in the apparatus 100, the apparatus 200 further includes: a down-sampling unit 105, configured to down sample the luminance map obtained by the luminance extracting unit 101; and an up-sampling unit 106, configured to up sample the background luminance map obtained by the interpolation unit 104.

Specifically, the down-sampling unit 105 can down sample the luminance map to a certain range of pixel numbers, for example, causes the long side of the luminance map to be smaller than 1000 pixels, etc, so that the amount of calculation can be reduced and the processing speed can be improved. After the interpolation unit 104 acquires the background luminance map, the up-sampling unit 106 up samples this background luminance map. To be noted, the down-sampling unit 106 can up sample this background luminance map to the original size of the image, or up sample it to another size, depending on the application situation of the background luminance map.

In conclusion, with the above mentioned apparatus 100 or 200, the background luminance maps of various document images including the document images with complex page layout can be extracted accurately.

Figure 12:
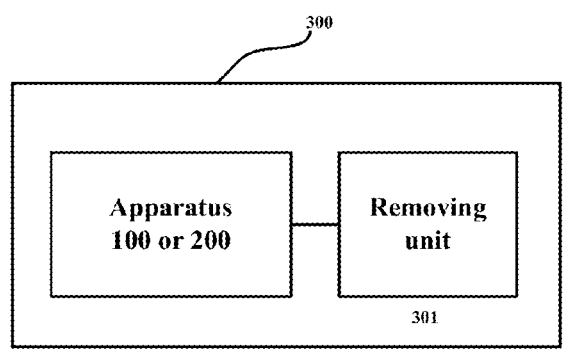
FIG. 12 illustrates a structural block diagram of the de-shading apparatus for removing shadings in an image according to an embodiment of the present application.

FIG. 12 illustrates a de-shading apparatus for removing shadings in an image, including the above mentioned apparatus 100 or 200 for extracting a background luminance map of an image. The apparatus 300 further includes: a removing unit 301, configured to remove affect of the background luminance map from the luminance map.

In an embodiment, the removing unit 301 is configured to divide the values in the luminance map by the values in the background luminance map, and multiply the results by a predetermined coefficient to adjust the whole luminance. Specifically, the de-shading operation is performed according to the following equation (6).

$$Y_{out}(x,y) = \omega * Y(x,y) / BI(x,y) \qquad (6)$$

Wherein, $Y_{out}(x,y)$ is the value in the finally acquired luminance map, Y(x,y) is the value in the luminance map acquired by the luminance extracting unit 101, BI(x,y) is the value in the background luminance map acquired through the processing of the apparatus 100 or 200, and $\omega$ is used to adjust the whole luminance. Generally, the whole image is brighter when $\omega$ is larger, otherwise, the whole image is darker.

Figure 13:
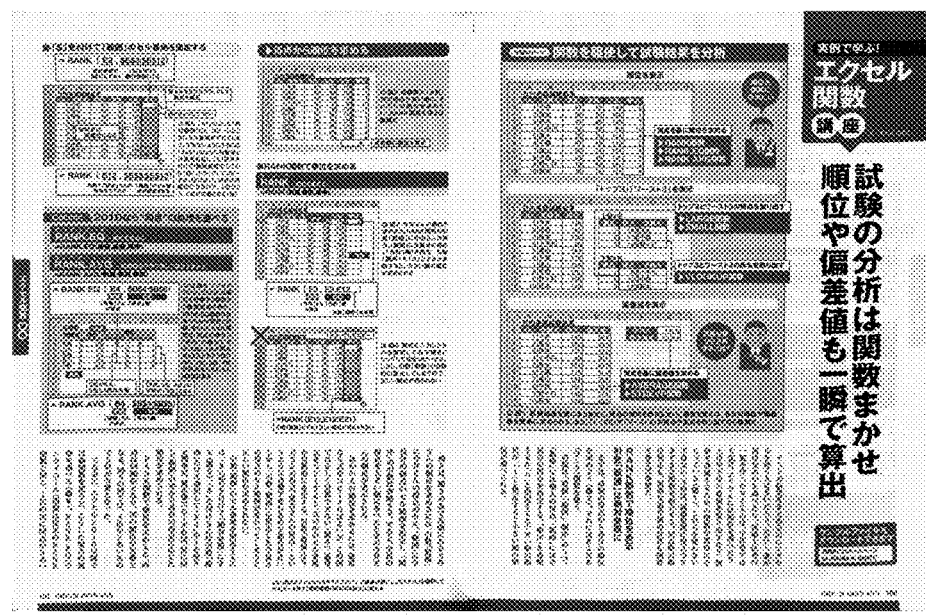
FIG. 13 illustrates an example of the image obtained after removing shadings of FIG. 1.

Still taking FIG. 1 as an example, the image acquired after performing de-shading processing by the apparatus 300 is shown in FIG. 13. As can be seen, most of the shadings have been removed, and the user's reading experience is improved.

In addition, if the processed image is a color image, it is also possible to convert $Y_{out}$, U, V to the original RGB space.

Since the apparatus 100 or 200 extracts the background luminance map of the image accurately, the above mentioned apparatus 300 can remove the shadings existing in the image effectively and rapidly. For example, the apparatus 300 can be included in or attached to a scanner or a digital camera, for performing de-shading processing on the acquired image. In addition, it can be understood that the scanner or the digital camera including the apparatus 300 also falls within the scope of the disclosure of the present application.

The embodiments of the apparatus for extracting a background luminance map of an image and the de-shading apparatus for removing shadings in an image according to the present invention have been described above in conjunction with the accompanying drawings. During the description, the method for extracting a background luminance map of an image and the de-shading method for removing shadings in an image are also described in fact. Below, a summary of the methods is described with reference to FIGS. 14-16, wherein the details can be found in the description on corresponding apparatus in the preceding.

Figure 14:
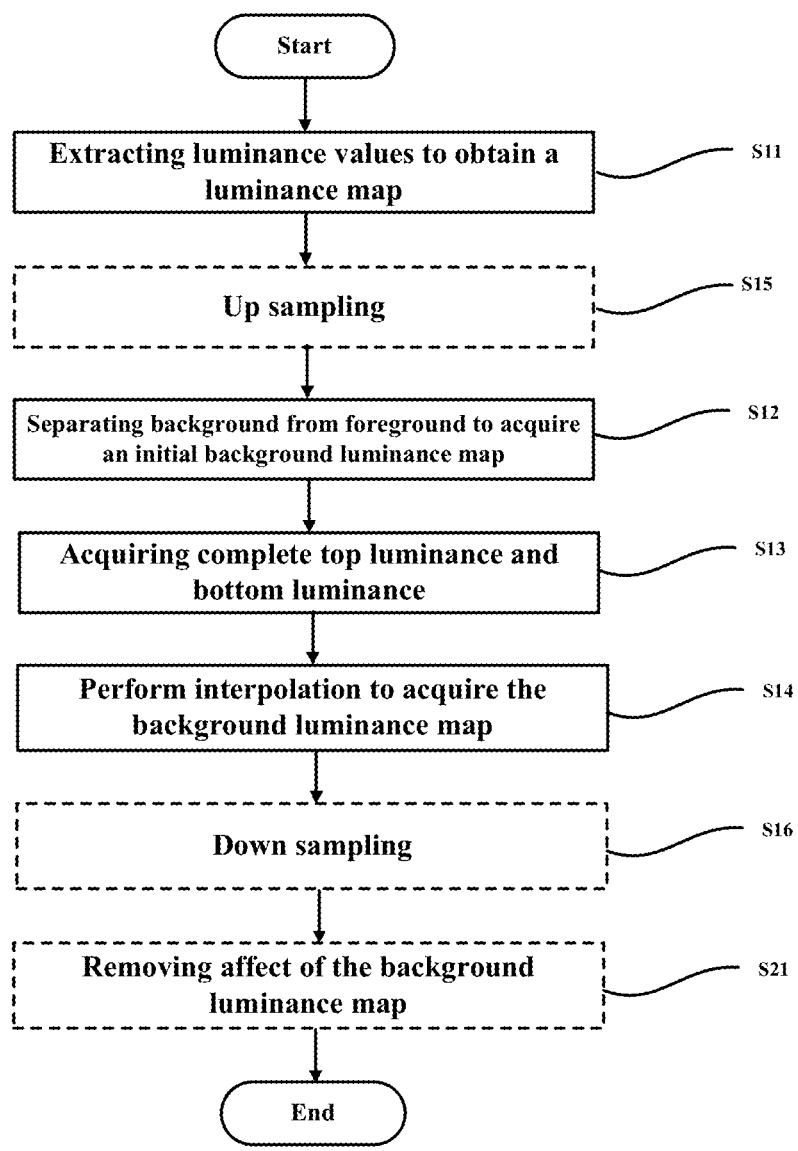
FIG. 14 illustrates a flowchart of the method for extracting a background luminance map of an image and the de-shading method for removing shadings in an image according to embodiments of the present application.

As shown in FIG. 14, the method for extracting a background luminance map of an image includes the following steps: extracting luminance values everywhere in the image to obtain a luminance map (S11); separating background from foreground of the image based on the luminance map, to obtain an initial background luminance map (S12); extracting values of a top row and a bottom row of the initial background luminance map as top luminance and bottom luminance respectively, and in the case of a part of the top luminance and/or the bottom luminance being missing, supplementing the missing part utilizing existing data of the top luminance and/or the bottom luminance to obtain complete top luminance and bottom luminance (S13); and performing interpolation on the whole image based on the complete top luminance and bottom luminance obtained, to obtain the background luminance map of the image (S14).

In addition, as shown by the dotted line blocks S15 and S16, to reduce the amount of calculation and improve speed, the above mentioned method can further include the step S15 after the step S11 but before the step S12: down sampling the luminance map obtained in step S11. Correspondingly, the step S16 is performed after the step S14: up sampling the background luminance map obtained in step S14.

The image processed herein can be a color image. In this case, the color image is converted into YUV color space and the Y image is assumed as the luminance map in step S11. The image herein can also be a grayscale image, and in this case, the luminance value is the grayscale value.

Figure 15:
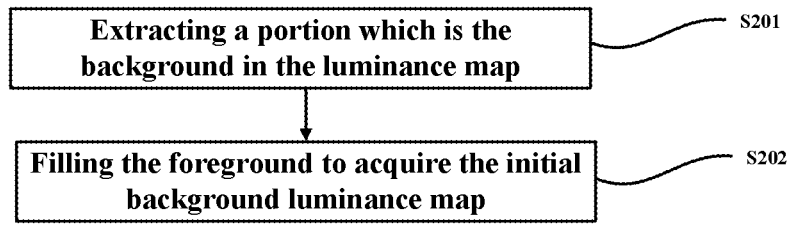
FIG. 15 illustrates a flowchart of the sub-steps of step S12 in FIG. 14.

In another embodiment, as shown in FIG. 15, the step S12 can include the following sub-steps: extracting a portion which is the background in the luminance map (S201); and filling the foreground to a certain extent using values of pixels of the background portion around the foreground, and taking the luminance map obtained after filling as the initial background luminance map (S202).

Figure 16:
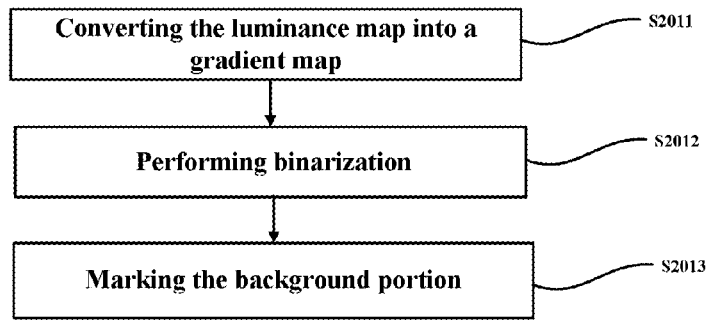
FIG. 16 illustrates a flowchart of the sub-steps of step S201 in FIG. 15.

As an example, as shown in FIG. 16, the step S201 can be implemented as follows: converting the luminance map into a gradient map (S2011); performing binarization of the gradient map (S2012); and marking a white connected component with the largest size and other white connected components whose average luminance is differed from that of the white connected component with the largest size within a certain range as the background portion (S2013).

In addition, in step S13, the missing part in the top luminance and/or bottom luminance can be supplemented by polynomial fitting based on the existing data. As an example, the least square method can be employed to perform the polynomial fitting.

In an embodiment, in step S13, the estimated luminance of the missing part in the top luminance and/or the bottom luminance is calculated based on a Lambertian reflectance model, and the estimated luminance related values are taken as part of the existing data to supplement the missing part in the top luminance and/or the bottom luminance. As an example, the estimated luminance related values can be the estimated luminance itself, or derivative of the estimated luminance along a direction in parallel to sides of the top and the bottom.

In addition, in step S13, linear interpolation based on the existing data can also be used to supplement the missing part in the top luminance and/or the bottom luminance.

On the other hand, if the average luminance or the average luminance and the average color of the background portion extracted in step S201 is lower than a certain threshold, both the top luminance and the bottom luminance are set to be the largest luminance value in corresponding columns of the luminance map in step S13. In this case, each column of the image has the same background luminance value, and it is unnecessary to perform interpolation.

Now referring back to FIG. 14, a de-shading method for removing shadings in an image is further illustrated. In addition to the above mentioned steps described with reference to FIG. 14, the de-shading method further includes a step S21 shown by a dotted line block: removing affect of the background luminance map from the luminance map.

In an embodiment, the step S21 includes dividing the values in the luminance map by the values in the background luminance map, and multiplying the results by a predetermined coefficient to adjust the whole luminance.

By using the de-shading method, since the background luminance map of the image is accurately extracted, the shadings in the image can be removed rapidly and effectively.

The respective constituting modules, units in the above mentioned apparatus can be configured by software, firmware, hardware or combination thereof. The specific means or manner for the configuration is known to those skilled in the art, and will not be stated here. In the case of the present application being implemented by software or firmware, a program constituting the software is installed in a computer with a dedicated hardware structure (e.g. the general computer 1700 shown in FIG. 17) from a storage medium or network, wherein the computer is capable of implementing various functions when installed with various programs.

Figure 17:
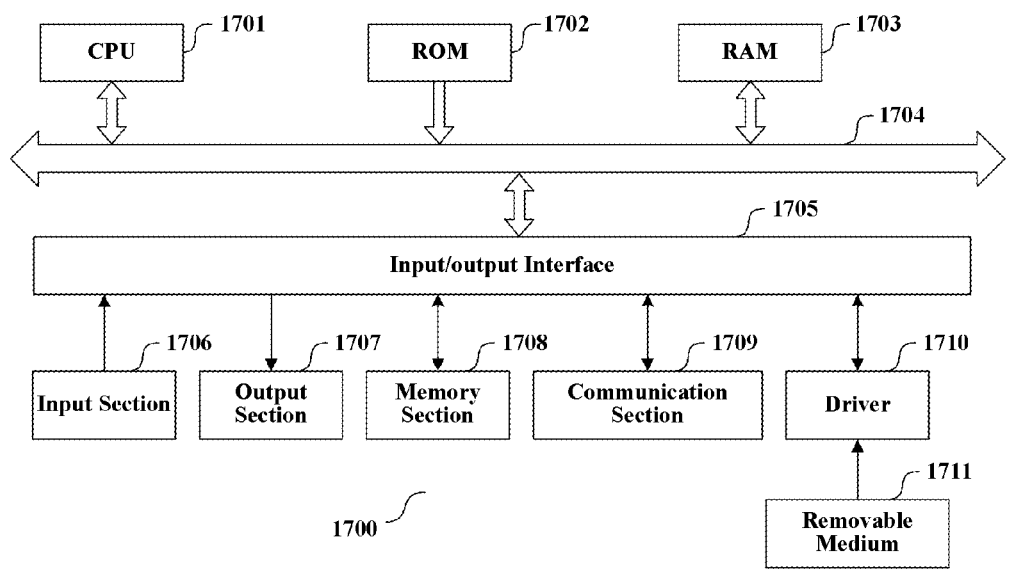
FIG. 17 is an exemplary block diagram illustrating the structure of a general purpose personal computer capable of realizing the method and/or apparatus according to the embodiments.

In FIG. 17, a computing processing unit (CPU) 1701 executes various processing according to a program stored in a read-only memory (ROM) 1702 or a program loaded to a random access memory (RAM) 1703 from a storage section 1708. The data needed for the various processing of the CPU 1701 may be stored in the RAM 1703 as needed. The CPU 1701, the ROM 1702 and the RAM 1703 are linked with each other via a bus 1704. An input/output interface 1705 is also linked to the bus 1704.

The following components are linked to the input/output interface 1705: an input section 1706 (including keyboard, mouse and the like), an output section 1707 (including displays such as a cathode ray tube (CRT), a liquid crystal display (LCD), a loudspeaker and the like), a storage section 1708 (including hard disc and the like), and a communication section 1709 (including a network interface card such as a LAN card, modem and the like). The communication section 1709 performs communication processing via a network such as the Internet. A driver 1710 may also be linked to the input/output interface 1705, if needed. If needed, a removable medium 1711, for example, a magnetic disc, an optical disc, a magnetic optical disc, a semiconductor memory and the like, may be installed in the driver 1710, so that the computer program read therefrom is installed in the memory section 1708 as appropriate.

In the case where the foregoing series of processing is achieved through software, programs forming the software are installed from a network such as the Internet or a memory medium such as the removable medium 1711.

It should be appreciated by those skilled in the art that the memory medium is not limited to the removable medium 1711 shown in FIG. 17, which has program stored therein and is distributed separately from the apparatus so as to provide the programs to users. The removable medium 1711 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1702 and the storage section 1708 in which programs are stored, and can be distributed to users along with the device in which they are incorporated.

The embodiments further provide a program product having machine readable instruction codes stored thereon. The instruction codes can implement the above mentioned method according to the embodiments when read and executed by the machine.

Accordingly, a memory medium for carrying the program product in which machine-readable instruction codes are stored is also covered. The memory medium includes but is not limited to soft disc, optical disc, magnetic optical disc, memory card, memory stick and the like.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments have been described above in detail in connection with the drawings, it shall be appreciated that the embodiments as described above are merely illustrative but not limitative thereof. Those skilled in the art can make various modifications and variations to the above embodiments without departing from the spirit and scope. Therefore, the scope is defined merely by the appended claims and their equivalents.

Through the above description, the embodiments of the present application provide the following technical solutions.

Appendix 1. An apparatus for extracting a background luminance map of an image, including:
a luminance extracting unit, configured to extract luminance values everywhere in the image to obtain a luminance map;
a separating unit, configured to separate background from foreground of the image based on the luminance map, to obtain an initial background luminance map;
a top and bottom luminance obtaining unit, configured to extract values of a top row and a bottom row of the initial background luminance map as top luminance and bottom luminance respectively, and in the case of a part of the top luminance and/or the bottom luminance being missing, to supplement the missing part utilizing existing data of the top luminance and/or the bottom luminance to obtain complete top luminance and bottom luminance; and
an interpolation unit, configured to perform interpolation on the whole image based on the complete top luminance and bottom luminance obtained by the top and bottom luminance obtaining unit, to obtain the background luminance map of the image.

Appendix 2. The apparatus according to appendix 1, further including:
a down-sampling unit, configured to down sample the luminance map obtained by the luminance extracting unit; and
an up-sampling unit, configured to up sample the background luminance map obtained by the interpolation unit.

Appendix 3. The apparatus according to appendix 1 or 2, wherein, the separating unit includes:
a background portion extracting module, configured to extract a portion which is the background in the luminance map; and
a filling module, configured to fill the foreground to a certain extent using values of pixels of the background portion around the foreground, and take the luminance map obtained after filling as the initial background luminance map.

Appendix 4. The apparatus according to appendix 3, wherein, the background portion extracting module includes:
a converting section, configured to convert the luminance map into a gradient map and perform binarization of the gradient map; and a marking section, configured to mark a white connected component with the largest size and other white connected components whose average luminance is differed from that of the white connected component with the largest size within a certain range as the background portion.

Appendix 5. The apparatus according to appendix 1 or 2, wherein, the top and bottom luminance obtaining unit is configured to supplement the missing part in the top luminance and/or the bottom luminance by utilizing polynomial fitting based on the existing data.

Appendix 6. The apparatus according to appendix 5, wherein, the top and bottom luminance obtaining unit is further configured to calculate estimated luminance of the missing part in the top luminance and/or the bottom luminance based on a Lambertian reflectance model and supplement the missing part in the top luminance and/or the bottom luminance by taking values related to the estimated luminance as part of the existing data.

Appendix 7. The apparatus according to appendix 6, wherein, the values related to the estimated luminance are derivative of the estimated luminance along a direction in parallel to sides of the top and the bottom.

Appendix 8. The apparatus according to appendix 5, wherein, the top and bottom luminance obtaining unit is configured to perform the polynomial fitting by using the least square method.

Appendix 9. The apparatus according to appendix 1 or 2, wherein, the top and bottom luminance obtaining unit is configured to supplement the missing part in the top luminance and/or the bottom luminance by utilizing linear interpolation based on the existing data.

Appendix 10. The apparatus according to appendix 3, wherein, the top and bottom luminance obtaining unit is further configured to set both the top luminance and the bottom luminance to be the largest luminance value in corresponding columns of the luminance map, in the case that an average luminance of the background portion extracted by the background portion extracting module is lower than a certain threshold.

Appendix 11. The apparatus according to appendix 1 or 2, wherein, the image is a color image, and the luminance extracting unit is configured to convert the color image into YUV color space and take the Y image as the luminance map.

Appendix 12. The apparatus according to appendix 1 or 2, wherein, the image is a grayscale image and the luminance value is the grayscale value.

Appendix 13. A de-shading apparatus for removing shadings in an image, including the apparatus according to any one of appendixes 1 to 12, and the de-shading apparatus further including:
a removing unit, configured to remove affect of the background luminance map from the luminance map.

Appendix 14. The apparatus according to appendix 13, wherein, the removing unit is configured to divide the values in the luminance map by the values in the background luminance map, and multiply the results by a predetermined coefficient to adjust the whole luminance.

Appendix 15. A scanner or a digital camera, including the de-shading apparatus according to appendixes 13 or 14.

Appendix 16. A method for extracting a background luminance map of an image, including:
extracting luminance values everywhere in the image to obtain a luminance map;

separating background from foreground of the image based on the luminance map, to obtain an initial background luminance map;

extracting values of a top row and a bottom row of the initial background luminance map as top luminance and bottom luminance respectively, and in the case of a part of the top luminance and/or the bottom luminance being missing, to supplement the missing part utilizing existing data of the top luminance and/or the bottom luminance to obtain complete top luminance and bottom luminance; and performing interpolation on the whole image based on the complete top luminance and bottom luminance obtained by the top and bottom luminance obtaining unit, to obtain the background luminance map of the image.

Appendix 17. The method according to appendix 16, wherein, polynomial fitting based on the existing data is adopted to supplement the missing part in the top luminance and/or the bottom luminance.

Appendix 18. The method according to appendix 17, wherein, estimated luminance of the missing part in the top luminance and/or the bottom luminance is calculated based on a Lambertian reflectance model and values related to the estimated luminance are taken as part of the existing data to supplement the missing part in the top luminance and/or the bottom luminance.

Appendix 19. The method according to appendix 18, wherein, the values related to the estimated luminance are derivative of the estimated luminance along a direction in parallel to sides of the top and the bottom.

Appendix 20. A de-shading method for removing shadings in an image, including the method according to any one of appendixes 16 to 19, and the de-shading method further including:

removing affect of the background luminance map from the luminance map.

The invention claimed is:

1. An apparatus for extracting a background luminance map of an image, comprising:
 a luminance extracting unit, configured to extract luminance values in the image to obtain a luminance map;
 a separating unit, configured to separate background from foreground of the image based on the luminance map, to obtain an initial background luminance map;
 a top and bottom luminance obtaining unit, configured to extract values of a top row and a bottom row of the initial background luminance map as top luminance and bottom luminance respectively, and in a case of a part of one of and both of the top luminance and the bottom luminance being missing, to supplement a missing part utilizing existing data of one of and both of the top luminance and the bottom luminance to obtain a complete top luminance and bottom luminance; and
 an interpolation unit, configured to perform interpolation on the image based on the complete top luminance and bottom luminance obtained by the top and bottom luminance obtaining unit, to obtain the background luminance map of the image.

2. The apparatus according to claim 1, further comprising:
 a down-sampling unit, configured to down sample the luminance map obtained by the luminance extracting unit; and
 an up-sampling unit, configured to up sample the background luminance map obtained by the interpolation unit.

3. The apparatus according to claim 1, wherein, the separating unit comprises:
 a background portion extracting module, configured to extract a background portion which is the background in the luminance map; and
 a filling module, configured to fill the foreground to an extent using values of pixels of the background portion around the foreground, and with the luminance map obtained after filling being the initial background luminance map.

4. The apparatus according to claim 3, wherein, the background portion extracting module comprises:
 a converting section, configured to convert the luminance map into a gradient map and perform binarization of the gradient map; and
 a marking section, configured to mark a white connected component with a largest size and other white connected components whose average luminance is different from that of the white connected component with the largest size within a range as the background portion.

5. The apparatus according to claim 1, wherein, the top and bottom luminance obtaining unit is configured to supplement any missing part in the top luminance and the bottom luminance by utilizing polynomial fitting based on the existing data.

6. The apparatus according to claim 5, wherein, the top and bottom luminance obtaining unit is further configured to calculate estimated luminance of the any missing part in the top luminance and the bottom luminance based on a Lambertian reflectance model and supplement the missing part with values related to the estimated luminance being part of the existing data.

7. The apparatus according to claim 6, wherein, the values related to the estimated luminance are derivative of the estimated luminance along a direction in parallel to sides of a top and a bottom.

8. The apparatus according to claim 3, wherein, the top and bottom luminance obtaining unit is further configured to set both the top luminance and the bottom luminance to be a largest luminance value in corresponding columns of the luminance map, in a case that an average luminance of the background portion extracted by the background portion extracting module is lower than a threshold.

9. A de-shading apparatus for removing shadings in an image, comprising the apparatus according to claim 1, and the de-shading apparatus further comprising:
 a removing unit, configured to remove an affect of the background luminance map from the luminance map.

10. One of a scanner and a digital camera, comprising the de-shading apparatus according to claim 9.

11. A non-transitory computer-readable storage medium storing a set of instructions which when executed by a processor, perform a method for extracting a background luminance map of an image, the method including:
 extracting luminance values in the image to obtain a luminance map;
 separating background from foreground of the image based on the luminance map, to obtain an initial background luminance map;
 extracting values of a top row and a bottom row of the initial background luminance map as top luminance and bottom luminance respectively, and in a case of a part of one and both of the top luminance and the bottom luminance being missing, to supplement a missing part utilizing existing data of one of and both of the top luminance and the bottom luminance to obtain a complete top luminance and bottom luminance; and performing interpolation on the image based on the complete top luminance and bottom luminance, to obtain the background luminance map of the image.

* * * * *